US012418115B2

(12) United States Patent
Abramovich et al.

(10) Patent No.: US 12,418,115 B2
(45) Date of Patent: Sep. 16, 2025

(54) SYSTEM AND METHOD FOR RECONFIGURABLE METASURFACE SUB REFLECTOR

(71) Applicant: ARIEL SCIENTIFIC INNOVATIONS LTD., Ariel (IL)

(72) Inventors: Amir Abramovich, Herzeliya (IL); David Rotshild, Karney Shomron (IL)

(73) Assignee: ARIEL SCIENTIFIC INNOVATIONS LTD., Ariel (IL)

(*) Notice: Subject to any disclaimer, the term of this patent is extended or adjusted under 35 U.S.C. 154(b) by 371 days.

(21) Appl. No.: 18/087,031

(22) Filed: Dec. 22, 2022

(65) Prior Publication Data

US 2023/0136472 A1 May 4, 2023

Related U.S. Application Data

(63) Continuation of application No. PCT/IL2021/050766, filed on Jun. 23, 2021.

(60) Provisional application No. 63/042,587, filed on Jun. 23, 2020.

(51) Int. Cl.
*H01Q 15/14* (2006.01)
*H01Q 3/46* (2006.01)
*H01Q 19/18* (2006.01)

(52) U.S. Cl.
CPC ............ *H01Q 15/148* (2013.01); *H01Q 3/46* (2013.01); *H01Q 19/18* (2013.01)

(58) Field of Classification Search
CPC ........ H01Q 3/44; H01Q 3/46; H01Q 15/0006; H01Q 15/0013; H01Q 15/006; H01Q 15/0066; H01Q 15/148; H01Q 19/18
See application file for complete search history.

(56) References Cited

U.S. PATENT DOCUMENTS 9,515,390 B1 12/2016 Feng
2019/0081618 A1* 3/2019 Liu ........................ H01Q 15/14
2024/0137076 A1* 4/2024 Yang .................. H01Q 15/0026

FOREIGN PATENT DOCUMENTS

CN 106785467 A 5/2017
CN 108682964 A 10/2018
CN 109067445 A 12/2018
CN 110829033 A 2/2020

OTHER PUBLICATIONS

International Search Report of PCT/IL2021/050766 Completed Nov. 9, 2021; Mailed Nov. 9, 2021 3 pages.

(Continued)

*Primary Examiner* — Daniel Munoz
(74) *Attorney, Agent, or Firm* — The Roy Gross Law Firm, LLC; Roy D. Gross

(57) ABSTRACT

A reconfigurable metasurface sub reflector comprises an array of cell units. Each sub unit is formed of two sub-unit cells formed with at least two conducting layers separated by a dielectric substrate. One conducting layer has, in each of the sub-unit cells, two parallel strips connected by a varactor and the other conducting layer serves as a ground layer. Setting the reverse biasing for each of the varactors controls the azimuth and elevation of reflection from the reconfigurable metasurface sub reflector.

14 Claims, 12 Drawing Sheets
(5 of 12 Drawing Sheet(s) Filed in Color)

(56) References Cited

OTHER PUBLICATIONS

Written Opinion of PCT/IL2021/050766 Completed Nov. 9, 2021; Mailed Nov. 9, 2021 5 pages.
Ratni, B., de Lustrac, A., Piau, G.-P., & Burokur, S. N. (2018). Active metasurface for reconfigurable reflectors. Applied Physics A, 124(2). doi:10.1007/s00339-017-1502-4.
Saikia, M., Srivastava, K. V., & Ramakrishna, S. A. (2019). Frequency Shifted Reflection of Electromagnetic Waves Using a Time-modulated Active Tunable Frequency Selective Surface. IEEE Transactions on Antennas and Propagation, 1-1. doi:10.1109/tap.2019.2951494.

* cited by examiner

Figure 5. *unit cell dynamic range of reflected phase as function of the $C_d$ at the 37 GHz* for normal incident and 2 extreme off-normal incident cases

SYSTEM AND METHOD FOR RECONFIGURABLE METASURFACE SUB REFLECTOR

CROSS-REFERENCE TO RELATED APPLICATIONS

This application is a Bypass Continuation of PCT Patent Application No. PCT/IL2021/050766 having International filing date of Jun. 23, 2021, which claims the benefit of priority of U.S. Provisional Application Ser. No. 63/042,587, filed Jun. 23, 2020, the contents of which are all incorporated herein by reference in their entirety.

BACKGROUND OF THE INVENTION

Metasurfaces (MS) are thin (2D) metamaterials compose of N×M cells, tailored to have unique electromagnetic properties. These metasurfaces can be reconfigurable by slightly changing the capacitance or inductance of their cells. Reconfigurable metasurfaces recently received a great interest from the scientific community owing to the broad range of applications. Metasurfaces are low-profile, less lossy, and easier to fabricate and they are very inexpensive. Furthermore, reconfigurable metasurfaces become very popular recently due to the ability to change the properties using external electric field or using another parameter. Many reconfigurable metasurfaces make use of VARACTOR diode to chance slightly the cell capacitance. There are some other methods to slightly change the unit cell properties such as: LCD, piezoelectric crystal, external magnetic field etc.

The development of the Fifth-Generation (5G) of cellular communications uses millimeter waves (MMW) for indoor, short-range links and for outdoor point to point links. Implementing antennas and reflectors for the $5^{th}$ Generation of wireless communication rise some challenges evolving from the nature of wave propagation in microwave and millimeter wave (MMW), ranging from 30 to 300 GHz. The propagation of MMW radiation is approximately like the ray-tracing model used in quasi optical and optical simulation codes. The propagation is affected by the atmospheric conditions, specular reflections and multi-path, and the directivity of transmitters and receivers. In outdoor communication it requires to bypass obstacles such as buildings and other constructions in urban areas or mountains etc. in non-urbane areas. On the other hand, indoor communication required tunable reflectors to bypass walls and turns.

The implementation of the fifth generation (5G) of cellular communication requires tracking the location of the user constantly, in order to direct the MMW beam correctly. The tracking procedure is carried out using the 4G network. Knowing the exact location of the user enables the base station to find the best trajectory using tunable reflectors, between the base station and the user. Tunable metasurface reflectors can be programed remotely by the base station in order to bring the beam optimally to the user.

According to embodiments of the present invention a reconfigure metasurface reflector for MMW radiation is suggested. This reflector can be used indoor and outdoor and it can be remote controlled. It can be used to overcome obstacles such as buildings, walls and turns.

SUMMARY OF THE INVENTION

A unit cell for use in re-configurable metasurface sub reflector is presented, the unit cell comprising two sub-unit cells disposed next to each-other and sharing a common center line, each of the sub-unit cells has a length P and a width W, at least two conducting layers disposed parallel to each other, at least one dielectric layer, disposed between the at least two conductive layers, wherein each of the sub-unit cells comprise, formed in a first conducting layer of the at least two conducting layers: a first strip disposed distal from the center line, and a second strip disposed proximal to the center line, wherein the first and the second strips of both sub-unit cells are formed as thin strip with their longitudinal dimension parallel to the center line and to each-other, and a voltage controlled capacitor disposed between the first and the second strips of both sub-unit cells.

In some embodiments the unit cell for use in re-configurable metasurface sub reflector wherein a second of the at least two conducting layers is adapted to function as a ground layer for the unit cell and the first conducting layer is adapted to be connected to voltage for controlling the capacitance of the voltage controlled capacitor.

In some embodiments the unit cell for use in re-configurable metasurface sub reflector wherein the length (P) of each of the sub-unit cells is no more than 0.33 of the wavelength of the operative frequency of the unit cell and the width (W) of each of the sub-unit cells no more than 0.2 of the wavelength of the operative frequency of the unit cell. In some embodiments the distance between the second strip of the first sub-unit cell and the second strip of the second sub-unit cell is approximately 0.07 of the wavelength of the operative frequency of the unit cell. In some embodiments the distance between the first strip and the second strip of the first and the second sub-unit cells is approximately 0.09 of the wavelength of the operative frequency of the unit cell.

In some embodiments the unit cell further comprising a second dielectric layer disposed on the free face of the second conducting layer and a third conducting layer disposed on the other side of the second dielectric layer, the third conducting layer having formed therein, a first pad connected a first strip of the first sub-unit cell and a second pad connected to the and a second pad connected to the first strip of the second sub-unit cell.

A re-configurable metasurface sub reflector is presented comprising plurality of metasurface unit cells, the sub reflector comprising an array of N×M unit cells, each of the unit cells comprising two sub-unit cells disposed next to each-other and sharing a common center line, each of the sub-unit cells has a length P and a width W, at least two conducting layers disposed parallel to each other, at least one dielectric layer, disposed between the at least two conductive layers, wherein each of the sub-unit cells comprise, formed in a first conducting layer of the at least two conducting layers: a first strip disposed distal from the center line and a second strip disposed proximal to the center line wherein the first and the second strips of both sub-unit cells are formed as thin strip with their longitudinal dimension parallel to the center line and to each-other, and a voltage controlled capacitor disposed between the first and the second strips of both sub-unit cells.

In some embodiments a second of the at least two conducting layers is adapted to function as a ground layer for the unit cell and the first conducting layer is adapted to be connected to voltage for controlling the capacitance of the voltage controlled capacitor.

In some embodiments the length (P) of each of the sub-unit cells is no more than 0.33 of the wavelength of the operative frequency of the unit cell and the width (W) of each of the sub-unit cells no more than 0.2 of the wavelength of the operative frequency of the unit cell.

In some embodiments the distance between the second strip of the first sub-unit cell and the second strip of the second sub-unit cell is approximately 0.07 of the wavelength of the operative frequency of the unit cell. In some embodiments the distance between the first strip and the second strip of the first and the second sub-unit cells is approximately 0.09 of the wavelength of the operative frequency of the unit cell.

In some embodiments the sub reflector further comprising a second dielectric layer disposed on the free face of the second conducting layer and a third conducting layer disposed on the other side of the second dielectric layer, the third conducting layer having formed therein, a first pad connected a first strip of the first sub-unit cell and a second pad connected to the and a second pad connected to the first strip of the second sub-unit cell.

A method for controlling the direction of reflection of radiation of electromagnetic waves from a re-configurable metasurface sub reflector is presented comprising providing a metasurface sub reflector and providing reverse voltage to each of the unit cells of the metasurface sub reflector according to control the direction of reflection in azimuth and in elevation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
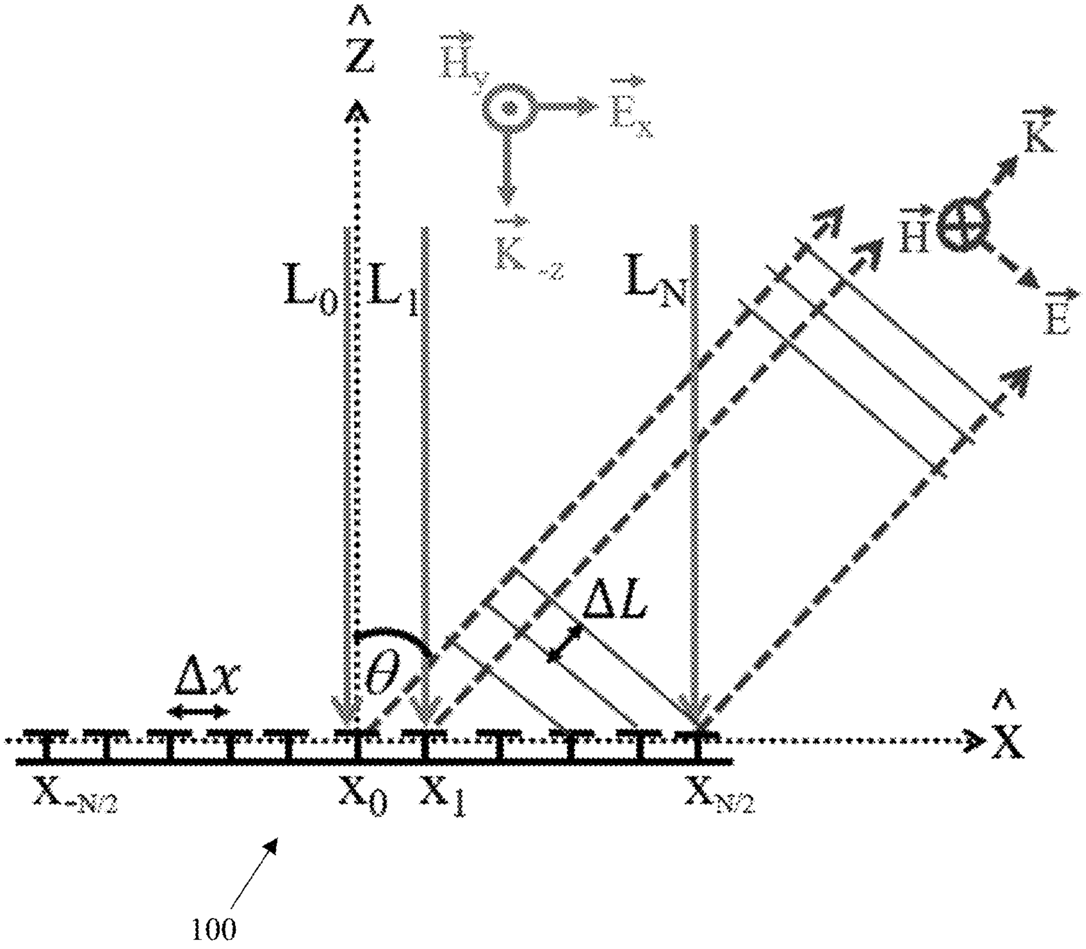
FIG. 1 schematically depicts reflection of incident rays from a reflector, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reflective MSs are based on unit cells which are smaller than the radiation wavelength. A basic equivalent circuit for the unit cell is a parallel resonance circuit. When the unit cells are arranged in a periodic two-dimensional form, the MSs are characterized by effective impedance surface:

$$Z_s = \frac{j\omega L}{1-\omega^2 LC} \quad (1)$$

Where L is the inductance and C is the capacitance of each unit cell, the parallel resonance frequency of the circuit is:

$$f_{res} = \frac{1}{2\pi\sqrt{LC}} \quad (2)$$

Where C and L are determined by the unit cell geometry, materials, and the PCB properties. The bandwidth of the resonance frequency is:

$$BW=1/(RC\omega_0)=(L\omega_0)/R\propto L/C \quad (3)$$

When R is the dissipation resistive part of the unit cell. This kind of surface is also known as High Impedance Surface (HIS) or Perfect Magnetic Conductor (PMC). For a resonance frequency, this surface reflects incident radiation at 0° phase in contrast to a normal metal surface which reflects the radiation at 180° phase. Varactor diodes which are inserted to the unit cell provide variable capacitance to enable tunability. When the phase values around the resonance frequency change significantly So changing the resonance changes the phase in the working frequency. Controlling the phase of each cell in the surface allows spatial phase design leading to the inclination of the radiation to a desired angle. So the tunability properties can be used for MS reflection.

Many Reconfigurable MSs based on varactor diodes were realized at X-band and below. For higher frequencies, only simulation works were published. However, realization MS at higher frequencies bands such as Ku-band, K-band and Ka-band requires decrease product LC in (2), which leads to difficulty and challenge since as a rule of thumb, C is proportional to the area of the unit cell and L to its thickness. This means that it is necessary to decrease of the unit cell dimensions. The reduction of L decreases bandwidth and increases the sensitivity to phase errors according (3). In addition the total absorption is given by R×Q, where the Q factor is Q=1/BW, decreasing C in (2) decreases the Q factor and reduces the unit cell absorption. Thus, to decrease product LC in (2), the emphasis is C reduction. Thus, in the existing geometry the varactor size becomes a significant part of the front MS area causing more absorption and diffusion, so another solution is needed.

According to embodiments of the present invention, a simple and inexpensive configuration for Ka-band is presented. This configuration enables a continuous dynamic phase range of 303° and wide bandwidth. A proposed unit cell of a MS according to embodiments of the present invention has a low intrinsic capacitance $C_{int}$, which enables MS realization for K-band with reasonable dimensions allowing conventional PCB manufacturing and varactors assembly.

According to phased array theory, the location of each unit cell on the MS is defined at its centre. A two-dimensional surface on XY plane with spatial array arrangement of a fixed distance and a 90° angle between the unit cells is defined as: S (xj, yi), i=1, . . . , 0 . . . , N and j=1, . . . , 0 . . . , M when N and M are an integer leads to an array of: N×M elements. Reference is made now to FIG. 1, which schematically depicts reflection of incident rays from reflector 100, according to embodiments of the present invention. MS reflector 100 is shown in side cross-section view, which depicts a reconfigurable MS reflector scheme. L1, L2, and LN are incident rays towards the surface. Due to a planned gradual phase provided by reconfigurable MS, the rays are reflected at an angle θ. The Optical Path Difference (OPD) between the cells is defined as ΔL and is described:

$$\Delta L=\Delta X\cdot\sin(\theta) \qquad (4)$$

Where ΔX is the array constant. The conversion of OPD into phase difference is described:

$$\Delta\varphi_x=360\cdot\Delta L/\lambda \qquad (5)$$

A gradual accumulating phase difference, Δφx, to each unit cell X(i) in x axis, yields to the desired steering angle θ in XZ plane. A final equation connecting Δφx and Δx to the angle θ using (4) and (5), is described:

$$\theta=\sin^{-1}(\lambda\cdot\Delta\varphi_x/360\cdot\Delta X) \qquad (6)$$

The same analysis can be done for steering angle θ in YZ plane by using Δφy and Δy in Equations 4-6. Those properties are frequency sensitive which allow to steer the reflection direction of an incident beam in a specific frequency band.

Figure 2A:
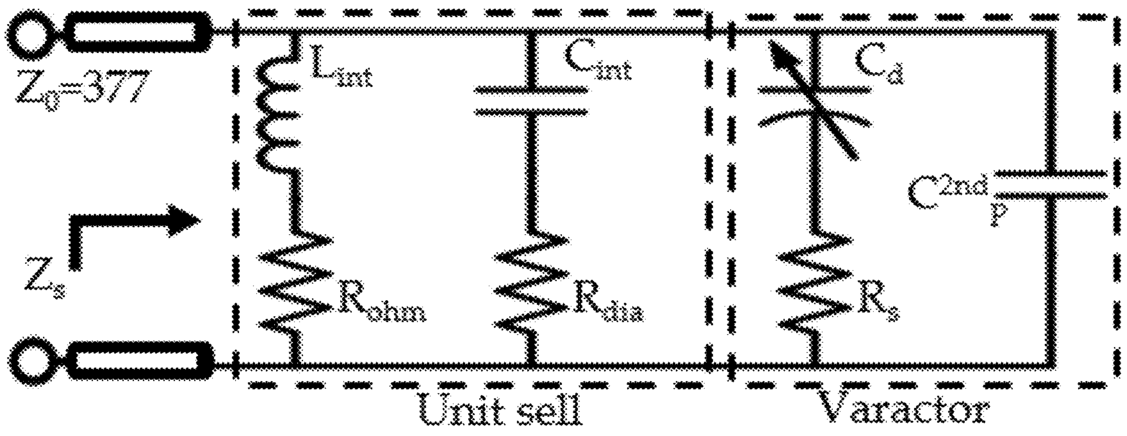
FIG. 2A is a schematic equivalent electrical circuit of a unit cell, according to embodiments of the present invention.

A unit cell size according to embodiments of the present invention is smaller than the wavelength and can be analyzed using a second-order parallel resonance circuit. Reference is made now to FIG. 2A which is a schematic equivalent electrical circuit 200 of a unit cell and to FIGS. 2B, 2C, 2D and 2E which are schematic front view, back view, side view and isometric view, respectively, of two adjacent unit cells according to embodiments of the present invention.

Figure 2B:
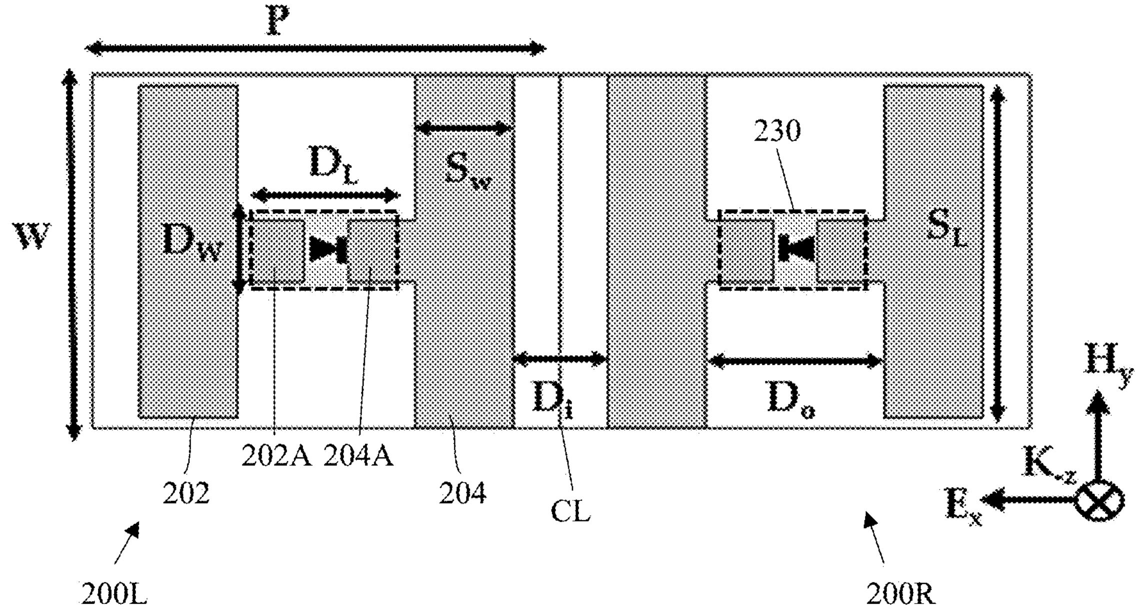
FIGS. 2B, 2C, 2D and 2E are schematic front view, back view, side view and isometric view, respectively, of two adjacent unit cells according to embodiments of the present invention.
Figure 2C:
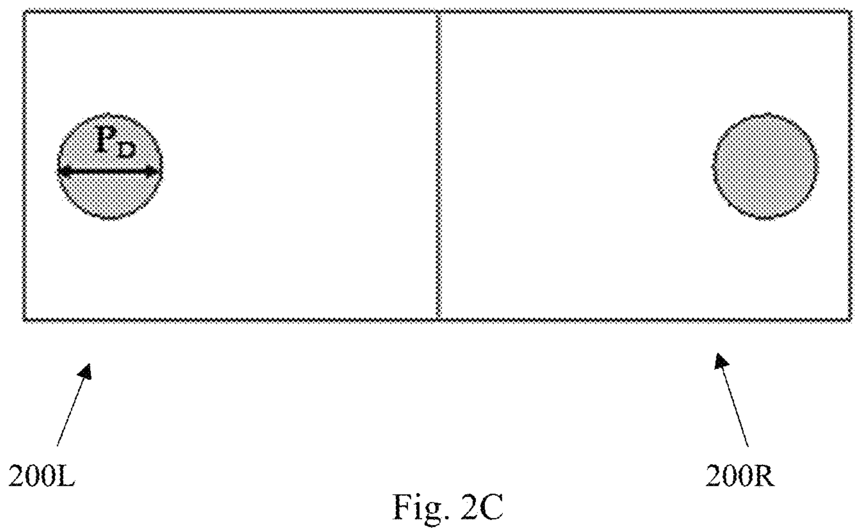
Figure 2D:
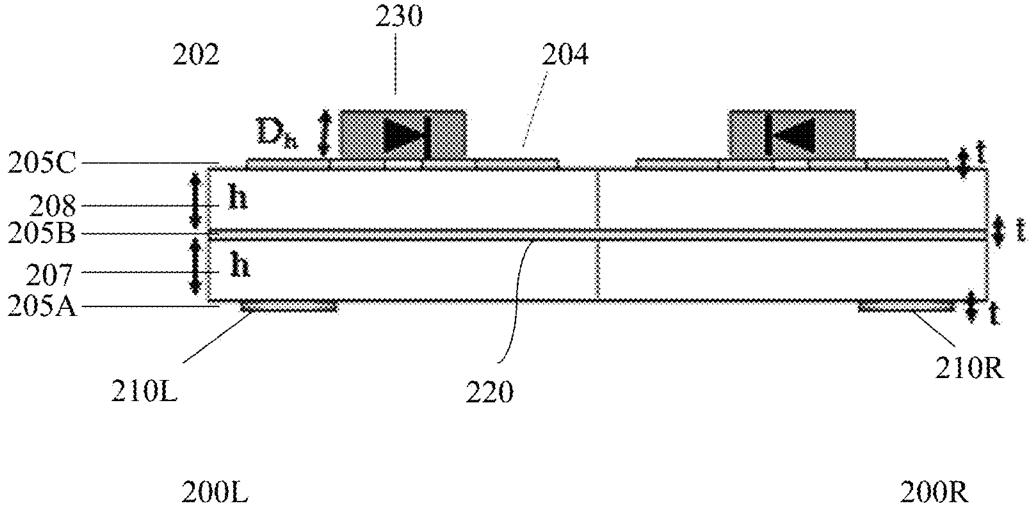
Figure 2E:
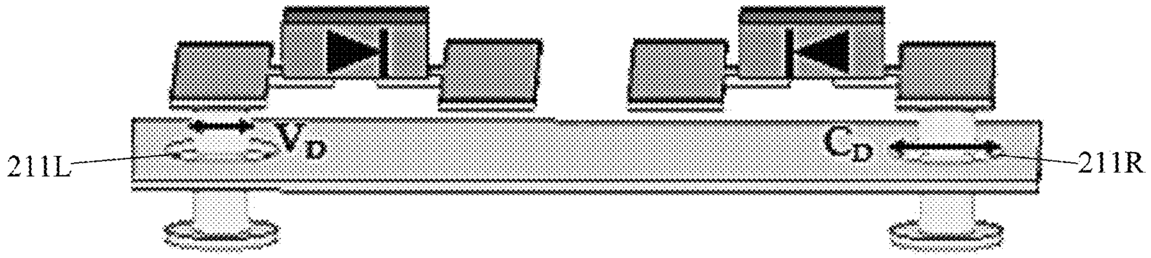

In a single unit cell, there is a small violation of the z axis symmetry, resulting from design constraints. In order to maintain the symmetrical array, the adjacent cell is a mirror image, as seen for example in FIG. 2B, so that the whole array is symmetric. The following dimensions are given as an example and it would be apparent to those skilled in the art that other physical features and dimensions which conform with the principles of a unit cell according to embodiments of the invention may be used. The following discussion of the dimensions of a unit cell is annotated only with regard to one of the "twin-like" unit cell sub-units, either 200L or 200R in order to not obscure the drawing, yet it would be apparent that respective dimension applies in the other unit cell, which is arranged in mirror-position with respect to the first unit cell. A unit cell such as sub-unit cell 200L or 200R may be composed of two similar dielectric substrates 207, 208 of, for example, model 5880 (Rogers Company) with $\varepsilon_r$=2.2, and three conducting layers (e.g. made of metal, such as copper) 205A, 205B and 205C of, for example, 35-micrometer thickness. In the top layer 205C, the two vertical strips 202, 204 may be disposed, each connected to a pad (202A, 204A respectively), thereby providing connection terminals to the varactor 230*t*. Strip 204 may have a length substantially equal the width W of the sub-unit cell 20L, 200R and the length of the shorter strip 204 is $-S_L$. Shorter strip 204 may be shorted, according to embodiments of the invention, by via to the circle pad 210L, 210R in lower copper layer 205A that functions as DC bias layer. The middle copper layer 205B may be for ground purposes and separated from the via which crosses it by passages 211L. 211R having clearance $C_D$ (FIG. 2E). The design of sub-unit cell 200L, 200R may consider the following: surface area size of the unit cell 205L, 205R is proportional to the unit cell intrinsic capacitance $C_{int}$, and the thickness to intrinsic inductance $L_{int}$. $C_{int}$ is governed by the interaction of the electromagnetic wave electric field component, with the edges of the strips in the unit cell. $C_{int}$ is inverse proportional to the distance between the strips' edges Dx (x: $_{i,\ L,\ O,\ W}$) according to:

$$C[F/m]=\frac{\pi\varepsilon_0\varepsilon_r}{\ln(4(S_w+D)/S_w)}l \qquad (7)$$

Where $S_W$ is the strip width. For example, the calculated capacitances contributions of the edges strips are 0.0451 pF and 0.0503 pF for $D_i$=0.9 mm and $D_o$=0.6 mm, respectively, as shown in FIG. 2B. These capacitances sum up to $C_{int}$=0.0954 pF. The decreasing of $C_{int}$ combined with the chosen varactor leads to a high capacitance ratio and allows a wide tunability. Analysis of the dynamic capacitance range will be given, considering the experimental results. The length P of the unit cell is larger than the width W and allows the strips to be positioned such that $D_o$ and $D_i$ lead to low intrinsic capacitance. Thus, the capacitance and coupling between adjacent unit cells decrease. This geometry enables operation at Ka-band frequencies, with sufficient surface area for the varactor integration, preventing significant absorbing and diffusing. Reduction of $S_w$ increases the distance between the strips and decreases the $C_{int}$ but also increases the unit cell losses, and therefore is limited. Furthermore, it distorts the uniformity of the electric field distribution on the unit cell and decreases bandwidth.

A varactor with low capacitance may be used in a unit cell according to embodiments of the present invention, for example a varactor diode model MAVR-011020-1411 (to MACOM Technology Solutions Inc.), which provides extremely low capacitance. The varactor 230 is placed between the strips 202 and 204 (see FIG. 2B), adding variable capacitance $C_d$ to the unit cell. The dynamic range of the capacitance, $C_d$, in the example of varactor diode model MAVR-011020-1411, is $C_{max}$=0.216 pF to $C_{min}$=0.032 pF for 0-15 V reverse bias voltage, respectively. The package capacitance is included in $C_d$ and provides a capacitance ratio of 7, where the final capacitance C and inductance L are determined by the unit cell geometry, the varactor diode, and the PCB properties. Thus, $C=C_{int}+C_d$ and $L=L_{int}$ in (1).

The following Tables 1A and 1B present the unit cell geometry parameters:

TABLE 1A

Parameters of a unit cell according to embodiments of the present invention, expressed in wavelength units, according to embodiments of the present invention:

| Parameter | Description | Rel. Dim. |
|---|---|---|
| P | Unit cell length | ≤0.33 λ |
| W | Unit cell width | ≤0.2 λ |
| $S_L$ | Pad/Line length | ≤1.9 λ |
| $S_w$ | Pad/Line width | ≤0.07 λ |
| $D_L$ | Varactor diode length | ≤0.09 λ |
| $D_w$ | Varactor diode width | ≤0.05 λ |
| $D_H$ | Varactor diode height | ≤0.025 λ |
| Di | Distance between external strips | ≤0.074 λ |
| Do | Distance between internal strips | ≤0.11 λ |
| h | Dielectric substrate thickness | ≤0.03 λ |
| t | Copper thickness | ≤0.004 λ |
| $P_D$ | Pad diameter | ≤0.074 λ |
| $V_D$ | Via diameter | ≤0.037 λ |
| $C_D$ | Clearness diameter | ≤0.07 λ |

TABLE 1B

Exemplary dimensions of a unit cell, for working frequency of 37 GHz:

| Parameter | Description | Value [mm] |
|---|---|---|
| P | Unit cell length | 2.7 |
| W | Unit cell width | 1.7 |
| $S_L$ | Pad/Line length | 1.6 |
| $S_w$ | Pad/Line width | 0.6 |
| $D_L$ | Varactor diode length | 0.7615 |
| $D_w$ | Varactor diode width | 0.406 |
| $D_H$ | Varactor diode height | 0.203 |
| Di | Distance between external strip | 0.6 |
| Do | Distance between internal strip | 0.9 |
| h | Dielectric substrate thickness | 0.254 |
| t | Copper thickness | 0.035 |
| $P_D$ | Pad diameter | 0.6 |
| $V_D$ | Via diameter | 0.3 |
| $C_D$ | Clearness diameter | 0.6 |

It would be apparent to those skilled in the art that the specific dimensions listed in Table 1B above are given as an example. A unit cell according to embodiments of the invention is a planar element comprising three parallel thin metal layers separated by two similar dielectric thin material. A first metal layer (hereinafter "top layer") may be used for forming the active elements of the unit cells. A second metal layer (herein after "middle layer") may be used as ground plane. A third (hereinafter 'lower layer') metal layer may be used for forming DC bias connection terminals, one for each of the two sub-unit cells. With reference to FIG. 2B each of the two sub-unit cells has a length dimension P and a width dimension W and each pair of sub-unit cells has a common edge along the width (W) dimension.

Each of the two sub-unit cells comprises two main strips 202, 204 parallel to each other and spaced by a dimension that is mainly dictated by the length of varactor diode 230 having a length DL. The length of strips 204, which are disposed closer to each other on both sides of the center line CL being the symmetry line of the unit cell. Strips 204 may have a length equal to the width dimension W of the unit cell, which enables connecting one end of each of strips 204 to a traverse electrical line, for example in order to complete the bias voltage circuit for varactor diode 230. Strips 202 of the two sub-unit cells are disposed farther from the CL line and may be slightly shorter than strips 204, to avoid their connection to the voltage bus of strips 204. In each sub-unit cell, a first diode connecting pad may be disposed alongside of strip 202 (diode bias line) on the side facing strip 204 and a second diode connecting pad may be disposed alongside of strip 204 (ground connection) on the side facing strip 202.

The distance between each pair of strips 204 is Di. It would be apparent that the width of strips 202 and 204 as well as the length and width of diode connection pads 202A. 202B are mainly dictated by production considerations (how accurate the topology may be produced, how big should a diode connection pad be), etc. while their impact on the operation of a metasurface built of an array of unit cells made according to embodiments of the present invention is minimal, and not more than of a second order of influence. Other considerations, such as internal electrical resistance that increases as the cross section of a layer trace decreases, internal capacitance that increases when the surface of the trace increases, and the like.

As shown in Table 1A above (in relative terms of the work wavelength) and given in specific exemplary length dimensions in Table 1B above: when the basic topology of a unit cell is kept, as related to the symmetry of each two sub-unit cells, to the position and orientation and the lengths of the strips and the distances between them, and the connection of a varactor diode between bias strip and ground strip—a unit cell according to embodiments of the present invention may be designed for operation in a work frequency selected from a wide range of working frequencies.

Figure 3A:
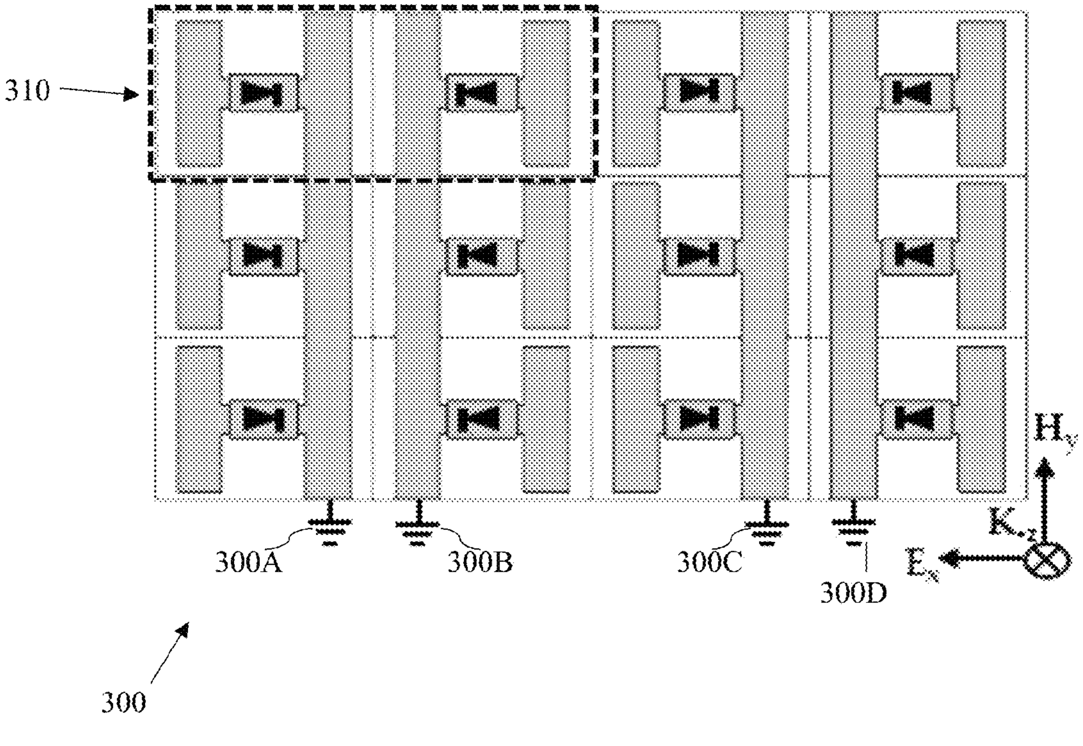
FIGS. 3A, 3B and 3C are schematic physical illustration of an array structure comprising multiple units cells, in top view, bottom view and isometric view, respectively, according to embodiments of the present invention.
Figure 3B:
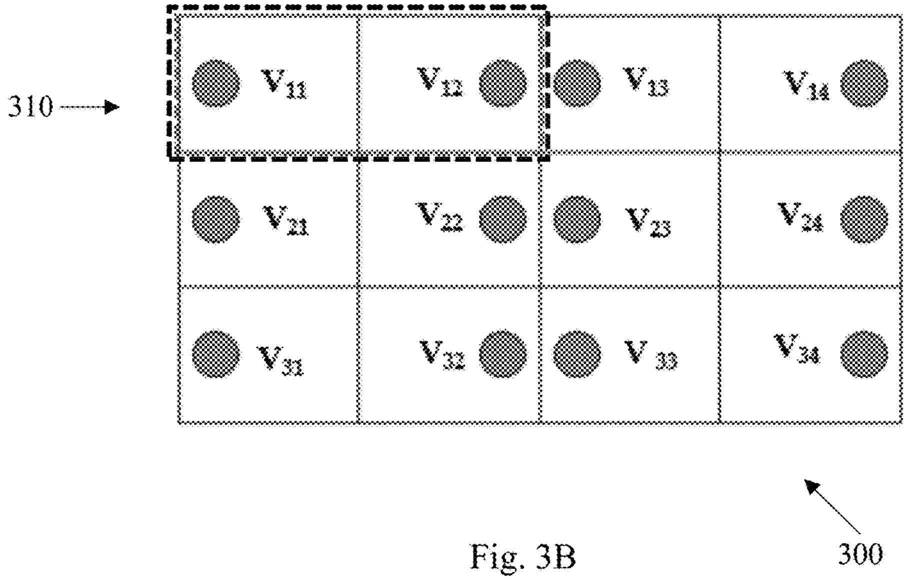
Figure 3C:
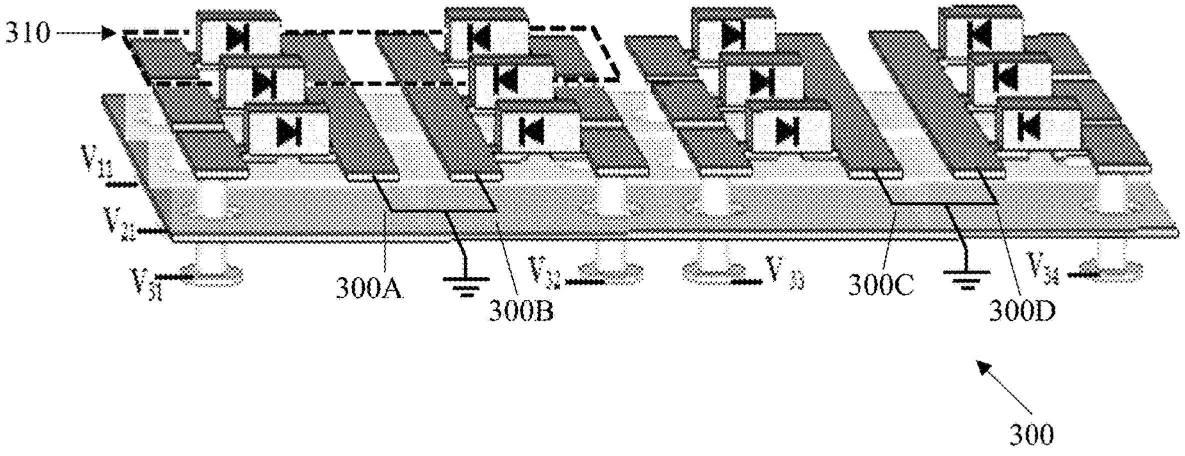
Figure 3D:
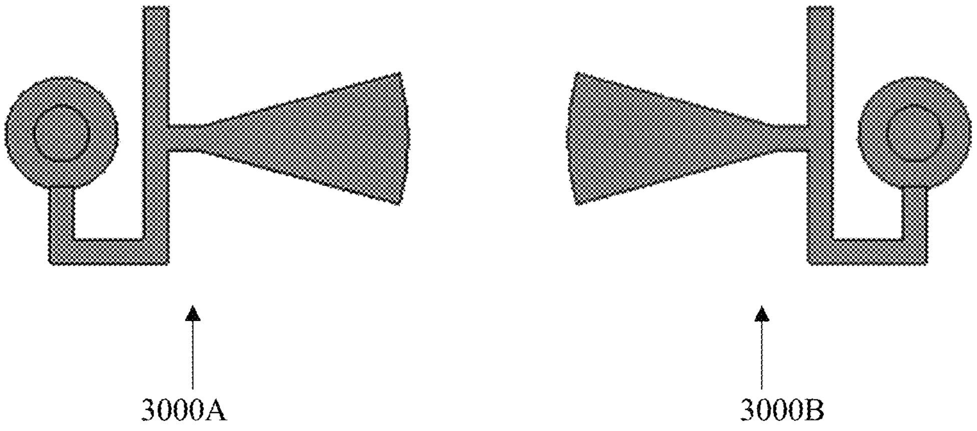
FIG. 3D presents a couple of radial stubs that may be used for providing DC to the DC terminals of the array structure of FIGS. 3A-3C, according to embodiments of the present invention.

Reference is made now to FIGS. 3A, 3B and 3C which are schematic physical illustration of array structure 300 comprising multiple units cells, in top view, bottom view and isometric view, respectively, according to embodiments of the present invention array structure 300 of this example comprise of three rows and three columns of unit cells, such as unit cell 310, which is surrounded in all three views (FIGS. 3A, 3B and 3C) by black dashed line. Bottom view of FIG. 3B and isometric view of FIG. 3C clearly shows biasing voltage terminal e.g., terminals V11 and V12 of unit cell 310. Isometric view of FIG. 3C shows the passage of Vcc terminals (such as terminals V11 and V12) through passage holes in the mid-layer, as described above. In the example of FIGS. 3A-3C the voltage provided at biasing terminals (e.g. V11-V12. V13-V14, etc.) is negative with respect to the ground (common) terminals such as terminals 300A-300D, in order to provide reverse voltage to the varactors. In order to connect DC biasing voltage to the DC terminals and prevent RF signal from reaching the DC circuitry RF Chokes, such as radial stubs, as is known in the art may be used. FIG. 3D, to which reference is now made, presents a couple of radial stubs 3000A and 3000B that may be used for providing DC to the DC terminals of array structure 300.

In some embodiments a final MS steering reflector may contain an array of 8×12 unit cells (e.g. 8-unit cells in width and 12 in length) thereby it contains 96 unit cells. The final size of a steering reflector according to some embodiments may be 75.2 mm×188 mm. All 96-unit cells in the array can be stimulated with separate DC voltages, as needed. The vias and the passage clearance add losses to the unit cell and are a constraint due to the need to provide DC voltages for diodes. Therefore, in one proposed geometry, the longer strip (e.g. strip 204 of FIG. 2B) may be connected to the same strips in other unit cell throughout the same column. These strips may function as ground bus for the diodes and may receive DC bias of, for example, 0 V at the edge of the surface, without the need for an additional via in each unit cell. In each unit cell. The shorter strip receives a separate DC voltage from the back of the surface (e.g. surface 205A of FIG. 2D) through the via, allowing each unit cell to be configurable independently. This design allows 2-D reflection steering to a proposed incident polarization as seen in FIG. 3A.

Figure 4A:
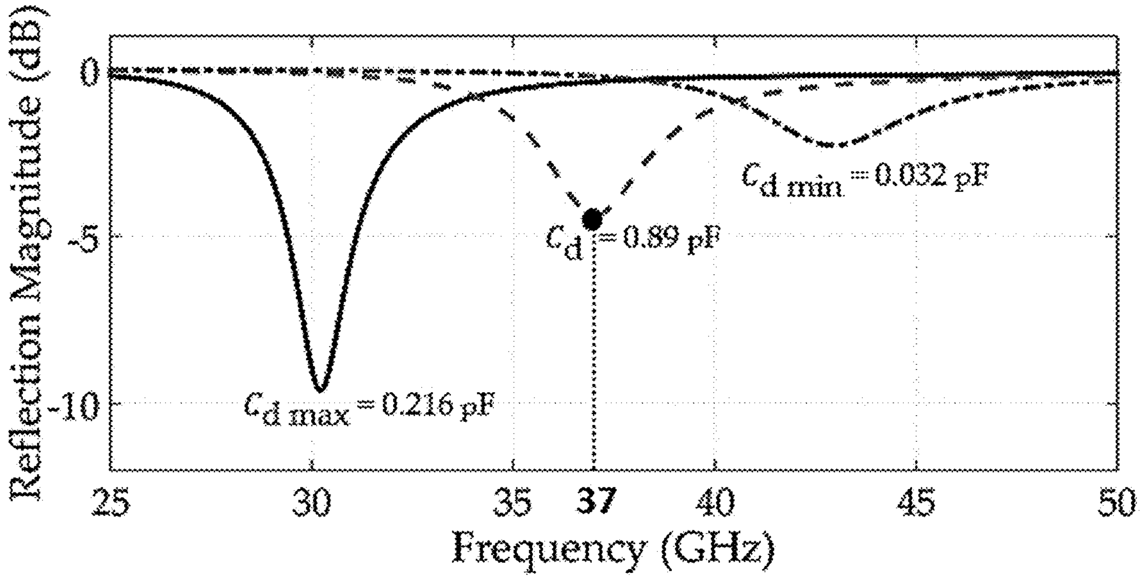
FIGS. 4A and 4B depict the reflection magnitude and reflection phase as a function of the operating frequency, according to embodiments of the present invention.
Figure 4B:
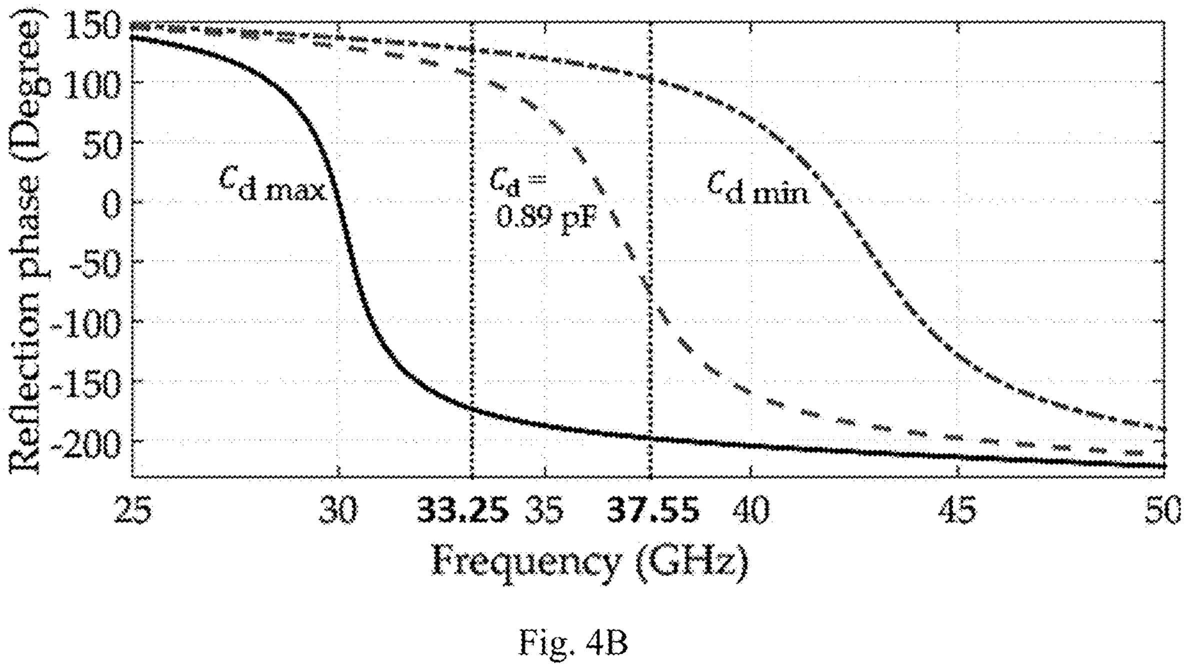

A reflector according to embodiments of the invention was simulated using the TEM Floquet port with 3D electromagnetic simulation code CST. The reflection simulation of a unit cell as an infinite array for normal incident, which corresponds to the polarization described in FIG. 2B is shown in FIGS. 4A and 4B to which reference is now made, for different capacitance values. FIGS. 4A and 4B depict the reflection magnitude and reflection phase as a function of the operating frequency in that simulation, according to embodiments of the present invention.

The unit cell reflection simulation results in magnitude (FIG. 4A) and phase (FIG. 4B) as function of frequency for the following three capacitance values: $C_{d\ min}$=0.032 pF (dash-dot black line), $C_{d\ max}$=0.216 pF (solid black line) and $C_d$=0.065 pF (dashed black line) which is related to the resonance frequency of the unit cell at 37 GHz (wavelength of 8.1 mm). R is composed of $R_{int}$—intrinsic dielectric and omics losses, $R_s$—varactor serial resistance, and $R_p$-inaccuracies and parasitics in production. The unit cell equivalent circuit model with all the inherent parameters and $R_p$ is shown in FIG. 2A. The value of the total resistance R influences only the absorption losses intensity. The unit cell equivalent circuit model with all the inherent parameters is shown in FIG. 1(*f*). While $R_{int}$ is well defined and quantified in CST simulation, $R_s$ value is unknown, and $R_p$ value depends on the production quality and not on unit cell inherent properties. Under requisition of stringent and accurate manufacturing requirements the sum of $R_s$ and $R_p$ is evaluate as 3Ω.

The physical presence of the varactor (e.g. varactor 230), which is in contact with the pads (e.g. pads 202A, 204A), adds parasitic capacitance to the unit cell and should be taken into consideration due to the low Cint and Cd in this realization. This parasitic capacitance may be defined as the second-order parasitic capacitance $C^{2nd}_p$. This value is influenced by the varactor environment and the varactor effective dielectric constant $\varepsilon_{eff}$, which depends on the varactor material compounds without a significant frequency dependence. $C^{2nd}_p$ is modeled in CST simulation as a varactor size rectangular dielectric slab with $\varepsilon_{eff}$ value, as shown by a rectangular dashed-line form in FIGS. 2B-2E. The dielectric values of the diode compounds are, in the simulated example, silicon nitride—7.65, polyimide—3.44, and Gallium arsenide—12.9 (the values from the CST library). Based on previous experiments compared to measurements made and in accordance with the possible range resulting from the diode components—$\varepsilon_{eff}$=6. According to the simulation, $C^{2nd}_p$=0.01 pF, a value which can usually be neglected. Design of a unit cell in accordance with embodiments of the invention requires careful design and analysis due to very small capacities in this unit cell, mainly when operating near $C_{min}$. The unit cell dynamic capacitance range is:

$$(C_{int}+C_{d\ min}+C^{2nd}_p)<C<(C_{int}+C_{d\ max}+C^{2nd}_p) \quad (4)$$

Where C is between 0.157 pF to 0.344 pF. There is good agreement between the measurements and simulations results in terms of the $f_{res}$ spectral lines, the phase curves, and the absorptions (see FIG. 2). Plugging C for different cases of $C_d$ in (2) shows excellent agreement in the $f_{res}$ tuning simulations results, shown in FIGS. 4A and 4B.

One of the possible applications for using a re-configurable surface is a reconfigurable reflect array. Ideally, to achieve the requested steering θ described in Eq. (6), gradual linear accumulated reflected phases and uniform reflected intensity are required. In practice, there is a deviation in intensity due to losses with maximum value of 4.37 dB when the unit cell resonance frequency is at 37 GHz as shown in FIG. 4A (middle dashed black line). Losses for higher or lower resonance frequency values are less than 4.37 dB at 37 GHz with a negligible value for resonance frequencies which relate to $C_{d\ max}$ and $C_{d\ min}$. This phenomenon of losses is unavoidable due to resonance element usage but can be minimized by proper unit cell design and use of materials with low losses.

Figure 5:
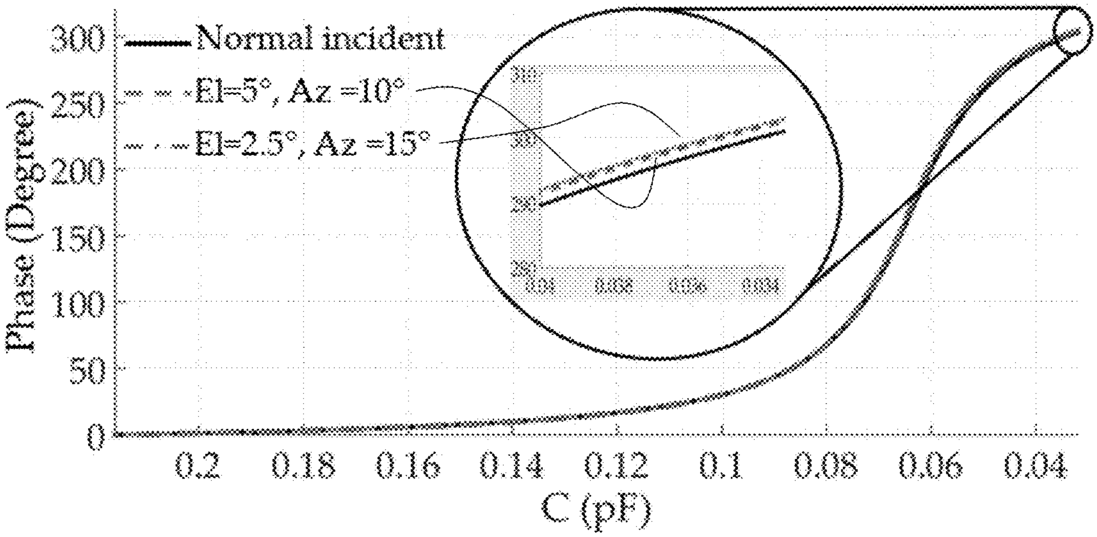
FIG. 5 schematically depicts the phase change as a function of the change in the total capacitance C, according to embodiments of the present invention.

Reference is made now to FIG. 5, which schematically depicts the phase change as a function of the change in the total capacitance C, according to embodiments of the present invention. FIG. 5 shows the whole dynamic phase range of a unit cell reflected phase at 37 GHz.

Figure 6:
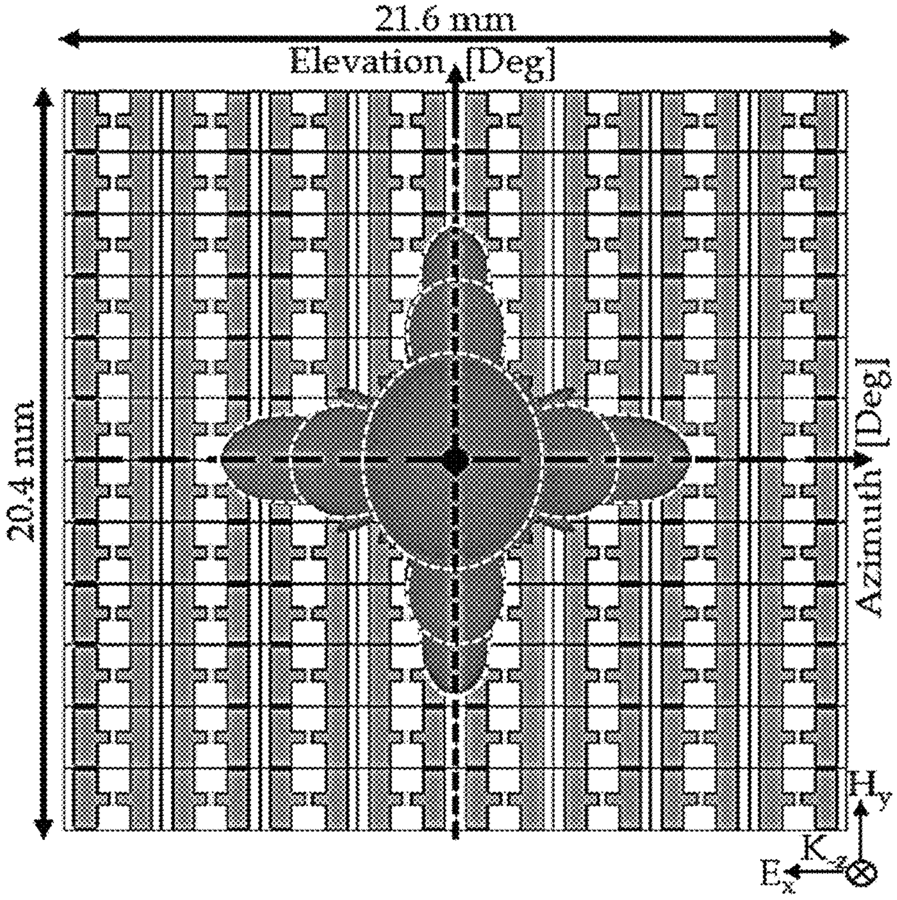
FIG. 6 is a schematic top view of a reconfigurable metasurface reflector of 12 rows by 8 columns with its radiation pattern, according to embodiments of the present invention.

Reference is made now to FIG. 6, which is a schematic top view of a reconfigurable metasurface reflector of 12 rows by 8 columns with its radiation pattern, according to embodiments of the present invention The radiation graph of FIG. 6 was plotted using simulation results which are described above. Phase values were normalized between 0° to 360°. The phase value is 0° for $C_{d\ max}$, and up to −303° for $C_{d\ min}$. Thus, the phase dynamic range is slightly above 300° out of the ideal value of 360° in the range of 33.25 GHz to 37.55 GHz. Consequently, the missing phase part limits the gradual change of the phase to Δφ≥57° and restricts the reflection steering angle θ according to (6). To overcome this limitation, the array constant Δx or Δy is multiplied compensating the limitation of reducing Δφ in (6). The Δx, Δy multiplication is achieved by applying the same DC voltage to adjacent columns or rows, respectively (see FIG. 4B) such that each pair of patch columns receives the same capacitance value. Δx, Δy can also be multiplied further where higher value leads to exceeding of MS definition.

Figure 8A:
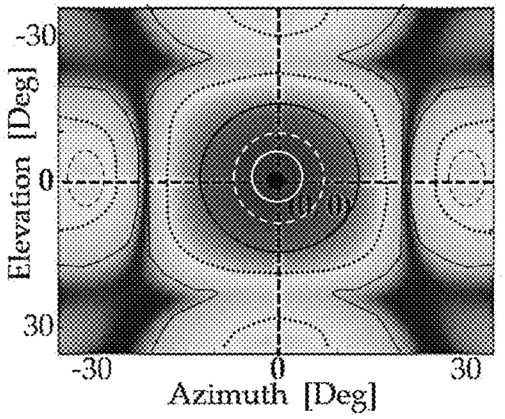
FIGS. 8A, 8B, 8C, 8D, 8E and 8F depict radiation patterns of a reconfigurable reflector in different offset azimuth and elevation angles, according to embodiments of the present invention.
Figure 8B:
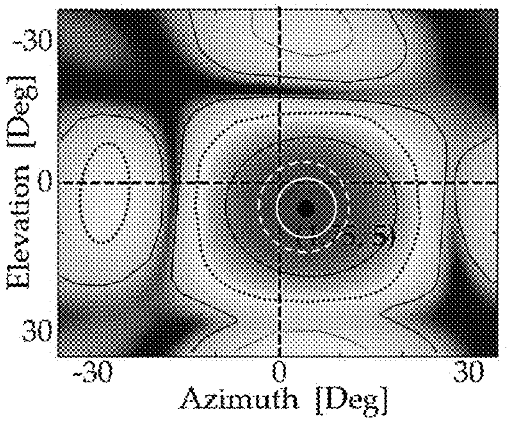
Figure 8C:
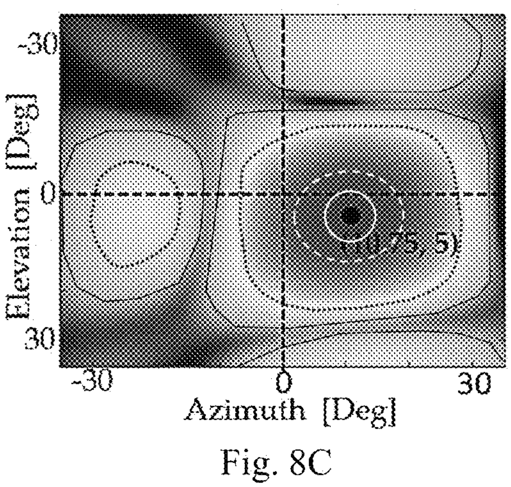
Figure 8D:
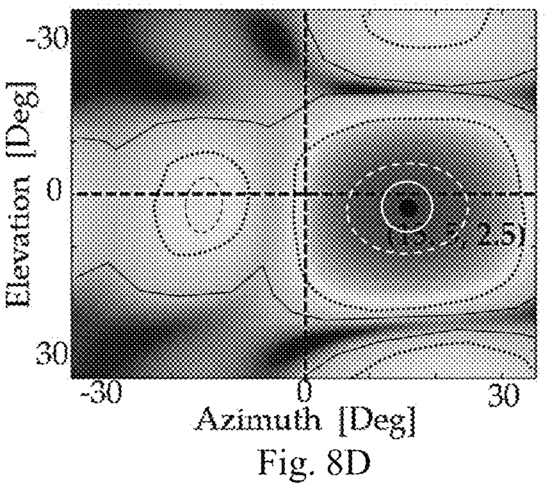
Figure 8E:
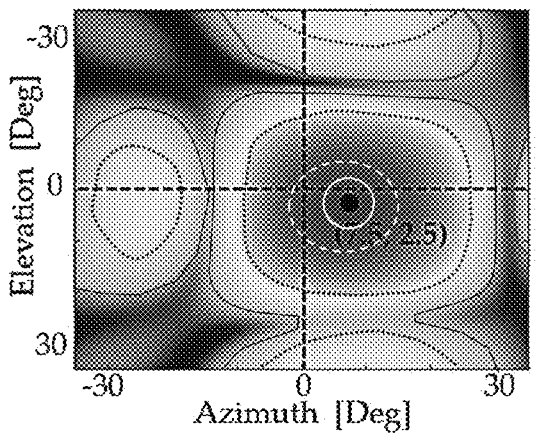
Figure 8F:
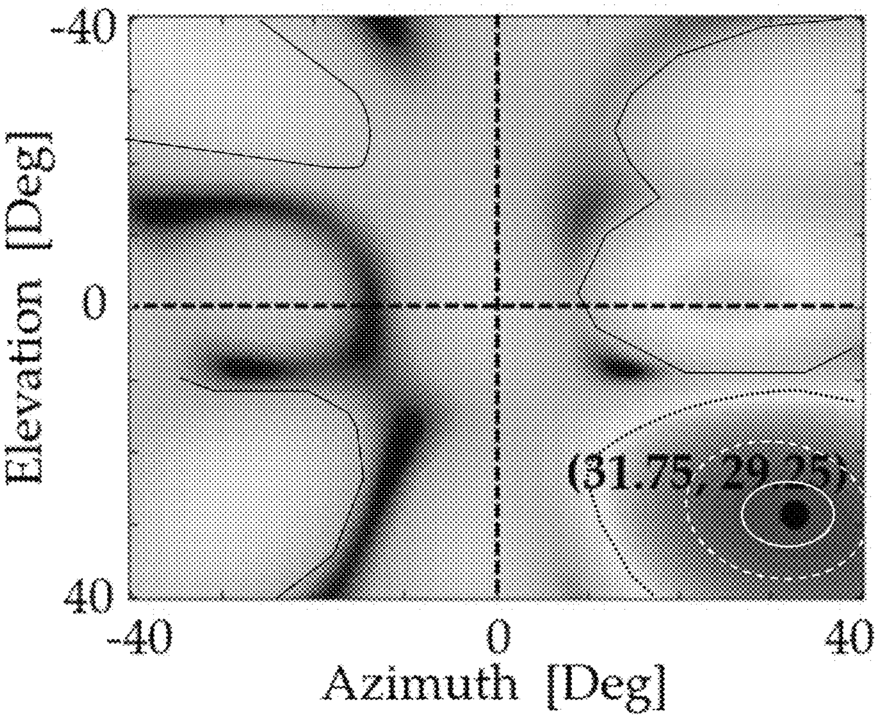

Alternatively, any steering can be achieved without multiplying Δx with performance degradation due to phase mismatch which occurs in each phase cycle. For small sized array, a small Δφ can be used without limitation if it is within one dynamic phase range cycle. This is a typical limitation of MS reflector. Furthermore, the barrier In embodiments of the current invention a larger dynamic range was achieved, improving the reflector performance. Based on the calibration curve in FIG. 8A, we may provide the reverse DC bias to each Array's unit cell such that the →$C_x$ between adjacent unit cells in the x̂ axis provides the desired $\Delta\varphi_x$, and the $\Delta C_y$ between adjacent unit cells in the ŷ axis provides the desired $\Delta\varphi_y$.

For steering in the Azimuth (x̂) axis only, each column has the same DC voltage, so $\Delta\varphi_y$=0 and for steering on the Elevation axis (ŷ) only, each row has the same voltage, so $\Delta\varphi_x=0$. Considering the dynamic phase range, the phase difference is limited to $$303° \geq 7\times\Delta\varphi_x, 11\times\Delta\varphi_y \quad (9)$$

$$303° \geq 11\times\Delta\varphi_y$$

Using Equation (9), the θ angle steering for the relevant axis is achieved.

For 2-D steering mode, the reflector can serve a spatial cone under 2-D phase distribution limit of:

$$303° \geq 7\times\Delta\varphi_x + 11\times\Delta\varphi_y \quad (10)$$

For example, steering ability of ±10 in Az and ±5 in El require $\Delta\varphi_x=20.83$ and $\Delta\varphi_y=6$, respectively, so all required phase in the array is 211.81° smaller than 303° and meets the definition.

Another example of embodiment of the present invention is steering ability of ±15 in Az and ±2.5 in El which require $\Delta\varphi_x=31.05$ and $\Delta\varphi_y=3.3$, respectively, sum up to 253.65° and also meets the definition.

Figure 7A:
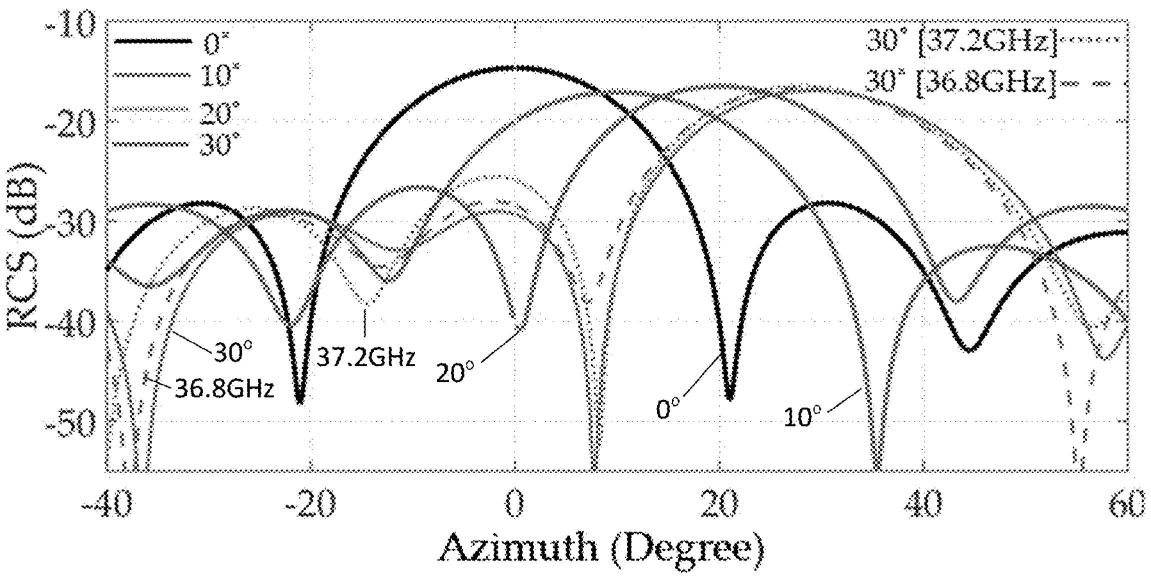
FIGS. 7A and 7B are graphs depicting beam steering performance of a re-configurable metasurface in azimuth and elevation, respectively, according to embodiments of the present invention.
Figure 7B:
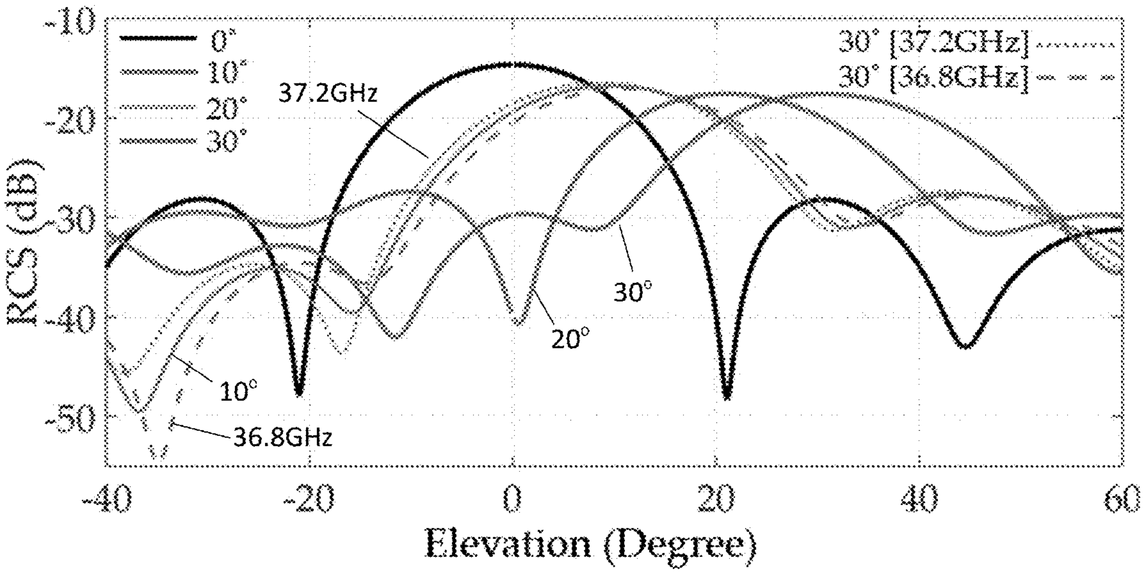

Reference is made now to FIGS. 7A and 7B, which are graphs depicting beam steering performance of a re-configurable metasurface in azimuth and elevation, respectively, according to embodiments of the present invention. The various graphs show changes in the RCS of the reflector as a function of the azimuth offset angle (FIG. 7A) or as a function of the elevation offset angle (FIG. 7B) for four values of phase calibration and for two different operation frequencies. These examples show that the phase calibration curves of radiation coming from the ages of the spatial cone that the reflector supports are coincide with the phase calibration for the normal radiation case, which facilitates the use of the reflector. Based on the above unit cell and phase calibration results, a real two-dimensional array was simulated. The rank of finite array is 12 rows and 8 columns of unit cells (see FIG. 6). MS reflector dimension is 256 mm×16 mm.

TABLE 2

| Parameters of Azimuth steering | | |
|---|---|---|
| Azimuth [Deg] | $\Delta\varphi_x$ [Degree] | Δx [mm] |
| 10 | 20.83 | 2.7 |
| 20 | 41.04 | 2.7 |
| 30 | 60 | 2.7 |

TABLE 3

| Parameters of Elevation steering | | |
|---|---|---|
| Elevation [Deg] | $\Delta\varphi_y$ [Degree] | Δy [mm] |
| 10 | 13.84 | 1.7 |
| 20 | 24.84 | 1.7 |
| 30 | 60 | 3.4 |

Reference is made now to FIGS. 8B-8F which are schematic two-dimensional radiation pattern graphs received for five different sets of offset azimuth and elevation angles, as compared to a reference radiation graph (FIG. 8A) according to embodiments of the present invention. The different operational parameters associated with the radiation pattern graphs are listed in Table 4 below.

TABLE 4

| Parameters of 2-D steering | | | | | |
|---|---|---|---|---|---|
| FIG. | Az, El [Deg] Calc/Sim | SLL [dB] | $\Delta\varphi_x$, $\Delta\varphi_y$ [Degree] | Δx, Δy [mm] | Efficiency |
| 8A | 0, 0/0, 0 | 13.5 | 0, 0 | 0, 0 | 1 |
| 8B | 5, 5/4.75, 5 | 11.2 | 10, 6 | 2.7, 1.7 | 0.54 |
| 8C | 10, 5/10.75, 5 | 11.8 | 20.83, 6 | 2.7, 1.7 | 0.446 |
| 8E | 7.5, 2.5/7.5, 2.5 | 11.8 | 15.66, 3.3 | 2.7, 1.7 | 0.507 |
| 8D | 15, 2.5/15.5, 2.5 | 11.5 | 31.05, 3.3 | 2.7, 1.7 | 0.5 |
| 8F | 30, 30/31.75, 29.25 | 8.25 | | | 0.314 |

The offset in the radiation intensity center may be achieved by providing proper different bias reverse voltage to the various varactors (e.g. varactor 230 of FIG. 2D) of the various unit cells.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A unit cell for use in re-configurable metasurface sub reflector, the unit cell comprising:

two sub-unit cells disposed next to each-other and sharing a common center line, each of the sub-unit cells has a length P and a width W;

at least two conducting layers disposed parallel to each other;

at least one dielectric layer, disposed between the at least two conductive layers;

wherein each of the sub-unit cells comprise, formed in a first conducting layer of the at least two conducting layers:

a first strip disposed distal from the center line; and a second strip disposed proximal to the center line, wherein the first and the second strips of both sub-unit cells are formed as thin strip with their longitudinal dimension parallel to the center line and to each-other; and a voltage controlled capacitor disposed between the first and the second strips of both sub-unit cells, wherein the distance between the second strip of a first sub-unit cell and the second strip of a second sub-unit cell is approximately 0.07 of the wavelength of the operative frequency of the unit cell.

2. The unit cell of claim 1, wherein a second of the at least two conducting layers is adapted to function as a ground layer for the unit cell and the first conducting layer is adapted to be connected to voltage for controlling the capacitance of the voltage controlled capacitor.

3. The unit cell of claim 1 wherein the length (P) of each of the sub-unit cells is no more than 0.33 of the wavelength of the operative frequency of the unit cell and the width (W) of each of the sub-unit cells no more than 0.2 of the wavelength of the operative frequency of the unit cell.

4. The unit cell of claim 1 wherein the distance between the first strip and the second strip of the first and the second sub-unit cells is approximately 0.09 of the wavelength of the operative frequency of the unit cell.

5. The unit cell of claim 1 further comprising a second dielectric layer disposed on the free face of the second conducting layer and a third conducting layer disposed on the other side of the second dielectric layer, the third conducting layer having formed therein, a first pad connected a first strip of the first sub-unit cell and a second pad connected to the and a second pad connected to the first strip of the second sub-unit cell.

6. A re-configurable metasurface sub reflector comprising plurality of metasurface unit cells, the sub reflector comprising:

an array of N×M unit cells, each of the unit cells comprising:

two sub-unit cells disposed next to each-other and sharing a common center line, each of the sub-unit cells has a length P and a width W;

at least two conducting layers disposed parallel to each other;

at least one dielectric layer, disposed between the at least two conductive layers;

wherein each of the sub-unit cells comprise, formed in a first conducting layer of the at least two conducting layers:

a first strip disposed distal from the center line; and a second strip disposed proximal to the center line, wherein the first and the second strips of both sub-unit cells are formed as thin strip with their longitudinal dimension parallel to the center line and to each-other; and a voltage controlled capacitor disposed between the first and the second strips of both sub-unit cells, wherein the distance between the second strip of a first sub-unit cell and the second strip of a second sub-unit cell is approximately 0.07 of the wavelength of the operative frequency of the unit cell.

7. The re-configurable metasurface sub reflector of claim 6, wherein a second of the at least two conducting layers is adapted to function as a ground layer for the unit cell and the first conducting layer is adapted to be connected to voltage for controlling the capacitance of the voltage controlled capacitor.

8. The re-configurable metasurface sub reflector of claim 6, wherein the length (P) of each of the sub-unit cells is no more than 0.33 of the wavelength of the operative frequency of the unit cell and the width (W) of each of the sub-unit cells no more than 0.2 of the wavelength of the operative frequency of the unit cell.

9. The re-configurable metasurface sub reflector of claim 7 wherein the distance between the first strip and the second strip of the first and the second sub-unit cells is approximately 0.09 of the wavelength of the operative frequency of the unit cell.

10. The re-configurable metasurface sub reflector of claim 6 further comprising a second dielectric layer disposed on the free face of the second conducting layer and a third conducting layer disposed on the other side of the second dielectric layer, the third conducting layer having formed therein, a first pad connected a first strip of the first sub-unit cell and a second pad connected to the and a second pad connected to the first strip of the second sub-unit cell.

11. A method for controlling the direction of reflection of radiation of electromagnetic waves from a re-configurable metasurface sub reflector comprising:

providing a re-configurable metasurface sub reflector comprising plurality of metasurface unit cells, the sub reflector comprising:

an array of N×M unit cells, each of the unit cells comprising:

two sub-unit cells disposed next to each-other and sharing a common center line, each of the sub-unit cells has a length P and a width W;

at least two conducting layers disposed parallel to each other;

at least one dielectric layer, disposed between the at least two conductive layers;

wherein each of the sub-unit cells comprise, formed in a first conducting layer of the at least two conducting layers:

a first strip disposed distal from the center line; and a second strip disposed proximal to the center line, wherein the first and the second strips of both sub-unit cells are formed as thin strip with their longitudinal dimension parallel to the center line and to each-other; and a voltage controlled capacitor disposed between the first and the second strips of both sub-unit cells, wherein the distance between the second strip of a first sub-unit cell and the second strip of a second sub-unit cell is approximately 0.07 of the wavelength of the operative frequency of the unit cell; and providing reverse voltage to each of the unit cells of the metasurface sub reflector according to control the direction of reflection in azimuth and in elevation.

12. The method of claim 11 wherein a second of the at least two conducting layers is adapted to function as a ground layer for the unit cell and the first conducting layer is adapted to be connected to voltage for controlling the capacitance of the voltage controlled capacitor.

13. The method of claim 11, wherein the length (P) of each of the sub-unit cells is no more than 0.33 of the wavelength of the operative frequency of the unit cell and the width (W) of each of the sub-unit cells no more than 0.2 of the wavelength of the operative frequency of the unit cell.

14. The method of claim 11 wherein the distance between the first strip and the second strip of the first and the second sub-unit cells is approximately 0.09 of the wavelength of the operative frequency of the unit cell.

* * * * *